(12) United States Patent
Joshi

(10) Patent No.: US 8,340,897 B2
(45) Date of Patent: Dec. 25, 2012

(54) PROVIDING CONTEMPORANEOUS MAPS TO A USER AT A NON-GPS ENABLED MOBILE DEVICE

(75) Inventor: Parag Mulendra Joshi, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1153 days.

(21) Appl. No.: 11/888,190

(22) Filed: Jul. 31, 2007

(65) Prior Publication Data

US 2009/0037099 A1   Feb. 5, 2009

(51) Int. Cl.
*G01C 21/30* (2006.01)
*G01C 21/32* (2006.01)

(52) U.S. Cl. ............. 701/409; 701/533; 455/456.3; 455/456.5; 455/456.6; 455/457

(58) Field of Classification Search ............ 701/208, 701/209, 409, 533; 455/436, 456.3, 456.5, 455/456.6, 457
See application file for complete search history.

(56) References Cited

U.S. PATENT DOCUMENTS

| | | | | |
|---|---|---|---|---|
| 7,089,110 B2* | 8/2006 | Pechatnikov et al. | ......... | 701/210 |
| 2002/0102989 A1* | 8/2002 | Calvert et al. | .............. | 455/456 |
| 2005/0063563 A1* | 3/2005 | Soliman | ..................... | 382/104 |
| 2005/0164716 A1* | 7/2005 | Kawamoto | ................ | 455/457 |
| 2005/0286421 A1* | 12/2005 | Janacek | ...................... | 370/231 |
| 2006/0142027 A1* | 6/2006 | Krishnamurthi et al. | ...... | 455/457 |
| 2006/0248224 A1* | 11/2006 | Belhoula et al. | .............. | 709/238 |
| 2008/0039120 A1* | 2/2008 | Gad | ............................ | 455/456.2 |
| 2008/0147730 A1* | 6/2008 | Lee et al. | ................... | 707/104.1 |
| 2008/0267504 A1* | 10/2008 | Schloter et al. | ............... | 382/181 |
| 2008/0267521 A1* | 10/2008 | Gao et al. | ..................... | 382/254 |

OTHER PUBLICATIONS

Garofalakis, et al., "Web Based Device Independent Mobile Map Applications. The m-CHARTIS System," IW3C2, May 23-26, 2006. www://mobile.my-symbian.com.
"Nokia Delivers Free Downloadable Maps to the Mobile World"; http:/mobilesearch.nokia.com/A4344239.
"LiveSearch for Windows Mobile available for your WinMob Treo"; http://palmaddict.typepad.com/palmaddicts/2007/06/live-search-for.html.
"iPhone to Reset Road Map for Mobile Content"; http://www.gartner.com/DisplayDocument?id=508203.
http://www.google.com/gmm/gps.html.
"Three Handy Sites for Your Mobile Device"; Jun. 10, 2007; http:/www.washingtonpost.com.

* cited by examiner

*Primary Examiner* — Dalena Tran
*Assistant Examiner* — Jamie Figueroa

(57) ABSTRACT

An exemplary method for providing contemporaneous maps to a user at a non-GPS enabled mobile device comprises obtaining a request from the mobile device, decoding the request to obtain multimedia data, analyzing the multimedia data to obtain location information, accessing a map database using the location information, generating a map image based on data from the map database, generating a response including the map image, and sending the response to the mobile device to enable a display of the map image at the mobile device.

19 Claims, 5 Drawing Sheets

_US 8,340,897 B2_

PROVIDING CONTEMPORANEOUS MAPS TO A USER AT A NON-GPS ENABLED MOBILE DEVICE

BACKGROUND

Mobile devices such as cellular phones have become ubiquitous. Some mobile devices are equipped with global positioning satellite (GPS) technology to enable users to determine their contemporaneous locations. However, mobile devices that are GPS enabled can be expensive.

A user with a non-GPS enabled mobile device generally cannot readily determine its current location. For example, a user may be able to obtain local map information via a non-GPS enabled mobile device that has a browser application and an Internet connection. However, obtaining local map information via an Internet connection typically requires the user to perform tedious entry of the street address and/or other information into a network interface.

Thus, a market exists for a system and method to readily and efficiently provide contemporaneous maps to a user at a non-GPS enabled mobile device.

SUMMARY

An exemplary method for providing contemporaneous maps to a user at a non-GPS enabled mobile device comprises obtaining a request from the mobile device, decoding the request to obtain multimedia data, analyzing the multimedia data to obtain location information, accessing a map database using the location information, generating a map image based on data from the map database, generating a response including the map image, and sending the response to the mobile device to enable a display of the map image at the mobile device.

An exemplary system for providing contemporaneous maps to a user at a non-GPS enabled mobile device comprises a map server accessible by the mobile device via a communication network. The map server includes a message decoder configured to obtain a request from the mobile device and decode the request to obtain multimedia data, a location recognition module configured to analyze the multimedia data to obtain location information, a local map creator configured to access a map database using the location information and generate a map image based on data from the map database, and a response generator configured to generate a response including the map image and send the response to the mobile device to enable a display of the map image at the mobile device.

Other embodiments and implementations are also described below.

DETAILED DESCRIPTION

I. Overview

Exemplary systems and processes for providing contemporaneous maps to a user at a non-GPS enabled mobile device are described herein.

Section II describes exemplary systems and processes providing contemporaneous maps to a user at a non-GPS enabled mobile device.

Section III describes an exemplary computing environment.

Figure 1:
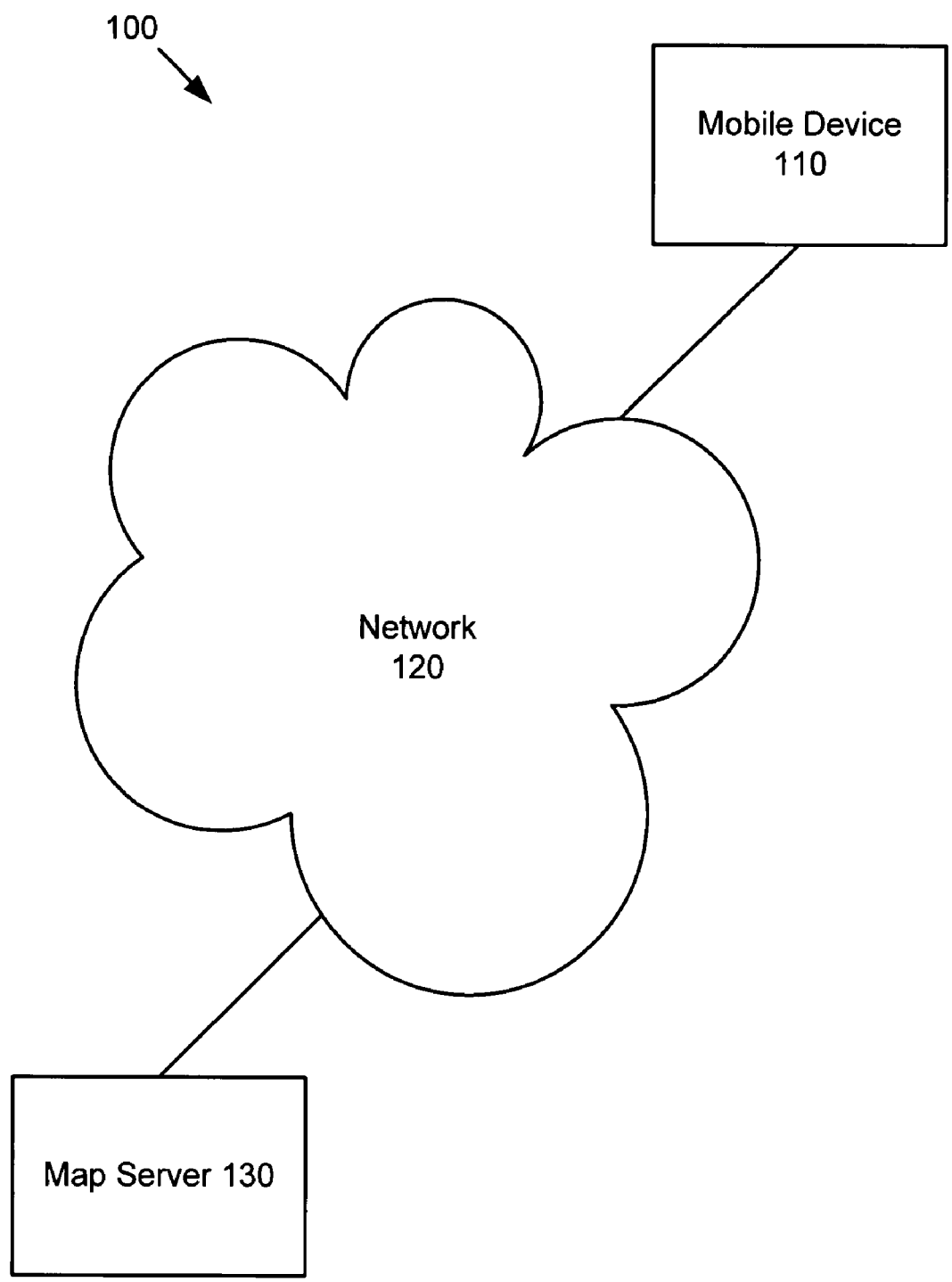
FIG. 1 illustrates an exemplary system for providing contemporaneous maps to a user at a non-GPS enabled mobile device.

II. Exemplary Systems and Processes for Providing Contemporaneous Maps to a User at a Non-GPS Enabled Mobile Device FIG. 1 illustrates an exemplary system 100 for providing contemporaneous maps to a user at a non-GPS enabled mobile device. The system 100 includes a non-GPS enabled mobile device 110 connected to a map server 130 via a network 120. An exemplary non-GPS enabled mobile device 110 will be described in more detail below with reference to FIG. 2. An exemplary map server 130 will be described in more detail below with reference to FIG. 3. The network 120 may comprise any communication network, distributed or otherwise.

The exemplary system 100 enables a user to obtain contemporaneous local maps of his/her current location without requiring a GPS enabled device. In an exemplary implementation, a user captures digital images of street names at his current location and sends the digital images to the map server 130. The map server 130 analyzes the digital images and/or any additional data from the user to determine the location of the user, generates a local map, and sends the local map back to the user.

Figure 2:
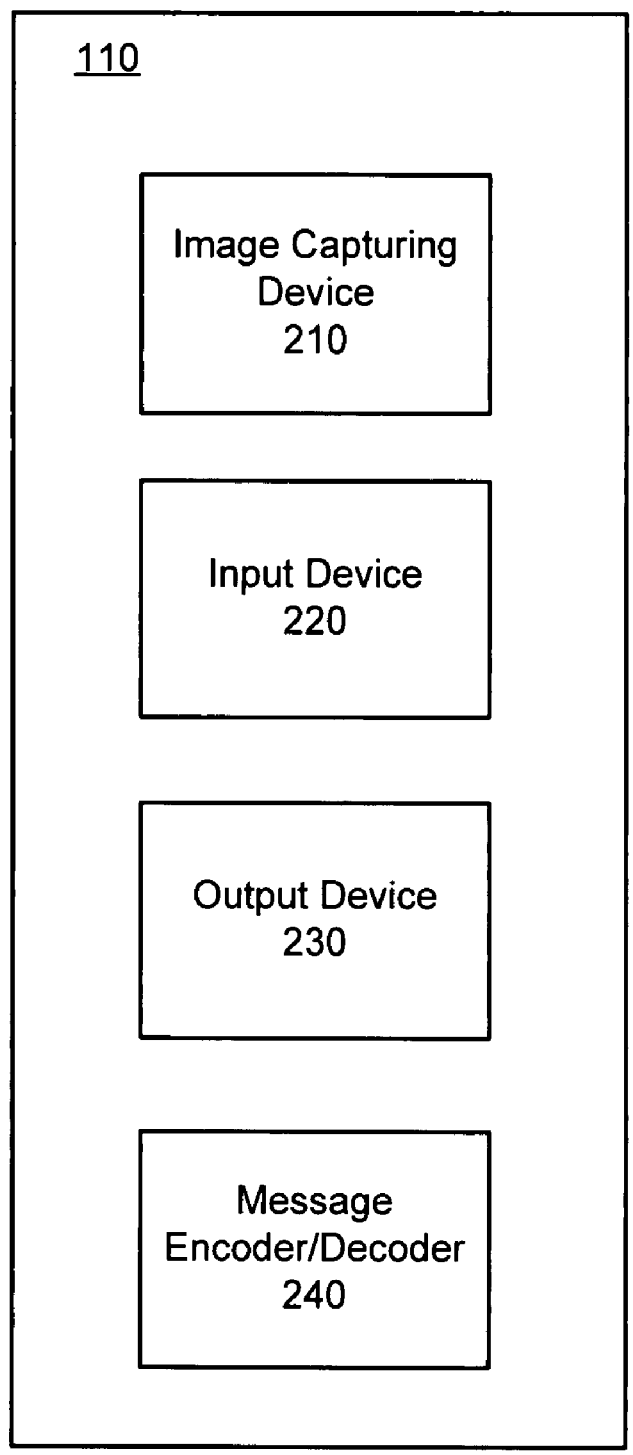
FIG. 2 illustrates an exemplary non-GPS enabled mobile device.

FIG. 2 illustrates an exemplary non-GPS enabled mobile device 110. The mobile device 110 includes an image capturing device 210, an input device 220, an output device 230, and a message encoder/decoder 240.

The image capturing device 210 may be a digital camera, a digital video recorder, or any other device capable of capturing digital images.

The input device 220 includes, without limitation, one or more of a keypad, a microphone, a stylus, and/or any other device capable of obtaining user input.

The output device 230 includes, without limitation, one or more of a computer screen, a liquid crystal display (LCD), a set of speakers, and/or any other device capable of rendering output to a user.

The message encoder/decoder 240 is configured to enable a user to send and receive messages from other devices. In an exemplary implementation, the message encoder/decoder 240 is configured in accordance with the multimedia messaging service (MMS) standard. Multimedia Messaging Service (MMS) is a standard for telephony messaging systems that enables users to send messages that include multimedia objects (images, audio, video, rich text), not just text as in Short Message Service (SMS). It is mainly deployed in cellular networks along with other messaging systems like SMS, Mobile Instant Messaging and Mobile E-mail. MMS-enabled mobile devices allow users to compose and send messages with one or more multimedia parts. These content types should conform to the MMS Standards. A MMS messaging client may be installed on a mobile device to enable the user to compose, address, send, receive, and view MMS messages. One skilled in the art will recognize that other mobile communication standards may be implemented depending on current trend and/or design choice.

Figure 3:
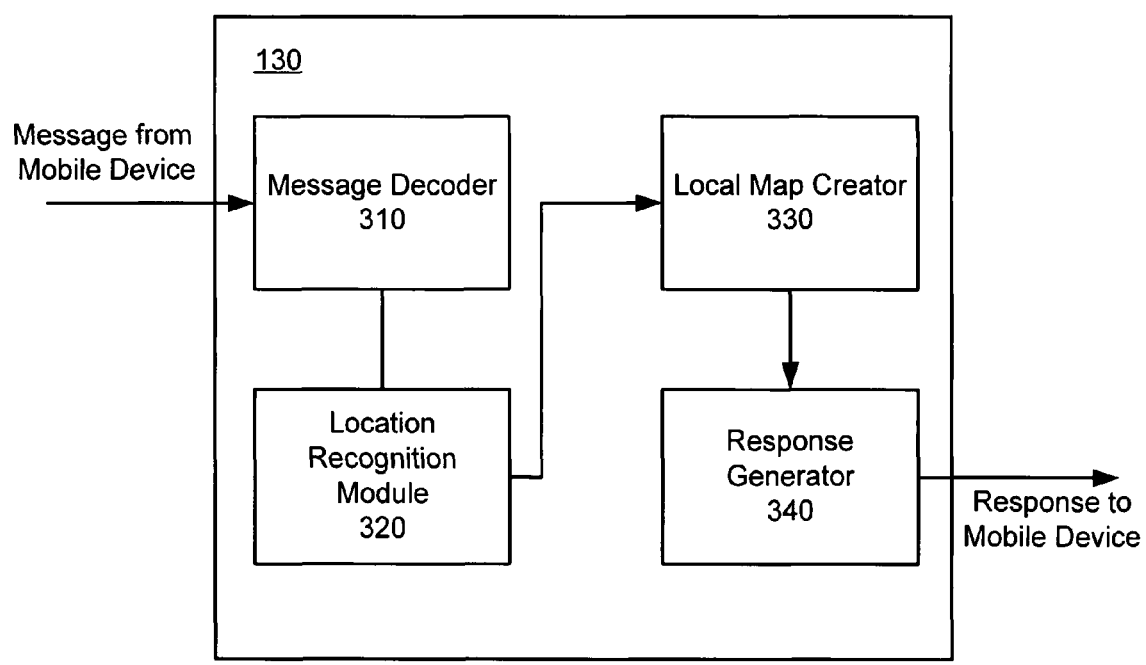
FIG. 3 illustrates an exemplary map server for providing contemporaneous maps to a user at a non-GPS enabled mobile device.

FIG. 3 illustrates an exemplary map server 130. The exemplary map server 130 includes a message decoder 310, a location recognition module 320, a local map creator 330, and a response generator 340. In an exemplary implementation, the map server 130 received non-GPS data from a non-GPS enabled mobile device 110.

In an exemplary implementation, the message decoder 310 is configured in accordance with the MMS standard for decoding MMS messages received from mobile devices. The message decoder 310 obtains a MMS message from a non-GPS mobile device 110 and extracts multimedia data and/or other optional data from the message. The optional data may include, without limitation, city, state, zip code, and/or other location-related information. The extracted data are forwarded to the location recognition module 320 to determine location information. Multimedia data include, without limitation, image data, audio data, video data, etc.

The location recognition module 220 applies image analysis techniques known in the art to extract information from the multimedia data useful for determining location. In an exemplary implementation, the location recognition module 220 may apply an optical character recognition (OCR) technique to analyze any image data by recognizing street names, street numbers, and/or other alphanumeric characters. For example, if an image received at the location recognition module 220 includes street signs at an intersection, the location recognition module 220 may be able to recognize street numbers and names in the image. Location information is forwarded to the local map creator 330 to generate a local map.

In another exemplary implementation, the multimedia data received from the non-GPS mobile device 110 may alternatively or in combination include audio data. In this example, the location recognition module 220 may analyze the audio data (e.g., using speech recognition technology known in the art) to extract location-related information.

The local map creator 330 accesses a map database to determine data for generating a local map using the location information extracted by the location recognition module 320. For example, the local map creator 330 may access a U.S. Geological Survey Geographic Information System (USGS GIS) database using a third-party application program interface (API), such as Microsoft® Mappoint or Google® Maps API. The local map creator 330 uses data obtained from a map database to generate a local map image. In an exemplary implementation, the local map image may be transformed to a format suitable for display at the non-GPS mobile device.

The response generator 340 generates a response, to be sent to the non-GPS mobile device, including the local map image. In an exemplary implementation, the response generator 340 is configured in accordance with the MMS standard for encoding and generating MMS responses.

Figure 4:
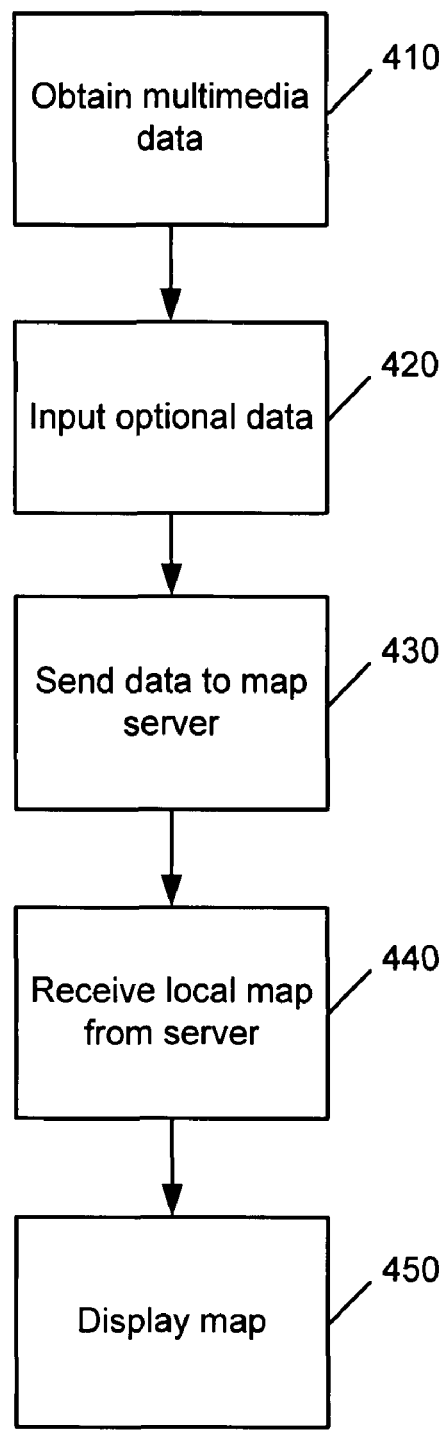
FIG. 4 illustrates an exemplary process for obtaining contemporaneous maps at a non-GPS enabled mobile device.

FIG. 4 illustrates an exemplary process for obtaining a local map at a non-GPS enabled mobile device.

At step 410, a user captures obtains or generates multimedia data relevant to his/her current location. Multimedia data include, without limitation, image data, audio data, video data, etc. In an exemplary implementation, digital images are captured using an image capturing device incorporated into a non-GPS enabled mobile device (e.g., a camera phone). In another exemplary implementation, the digital images may be captured by an image capturing device separate from the non-GPS enabled mobile device then uploaded onto the mobile device. In yet another exemplary implementation, the user may alternatively record an audio message relating to the current location. In this example, the user may not capture any images.

At step 420, the user may input optional location-related data into the non-GPS enabled mobile device. For example, the user may input the street address, the state, city, zip code, and/or other information using an input device (e.g., a keypad, a stylus, a microphone, etc.). Additional location information is optional because the map server 130 does not necessarily require the information to discern the user's current location.

At step 430, multimedia data are sent from the non-GPS enabled mobile device to the map server 130 via a network 120. In an exemplary implementation, the data are included in an MMS message generated in conformance with the MMS standard.

At step 440, the non-GPS enabled mobile device receives a contemporaneous local map from the map server 130. In an exemplary implementation, the mobile device may also receive navigational directions from the map server 130. For example, if data relating to multiple locations were sent to the map server 130, the server could generate and return navigational directions for the user to travel from one location to another location. In an exemplary implementation, the local map is included in an MMS response generated in conformance with the MMS standard. An exemplary process performed by the map server 130 for generating the local map will be described in more detail below with reference to FIG. 5.

At step 450, the non-GPS enabled mobile device displays the local map to the user. In an exemplary implementation, the response from the map server 130 is decoded and the local map image is extracted. In some instances, the local map image file may require reformatting prior to being displayed on an output device of the mobile device. In an exemplary implementation, if navigational directions are included in the response, the directions can be displayed or otherwise presented to the user (e.g., via audio).

Figure 5:
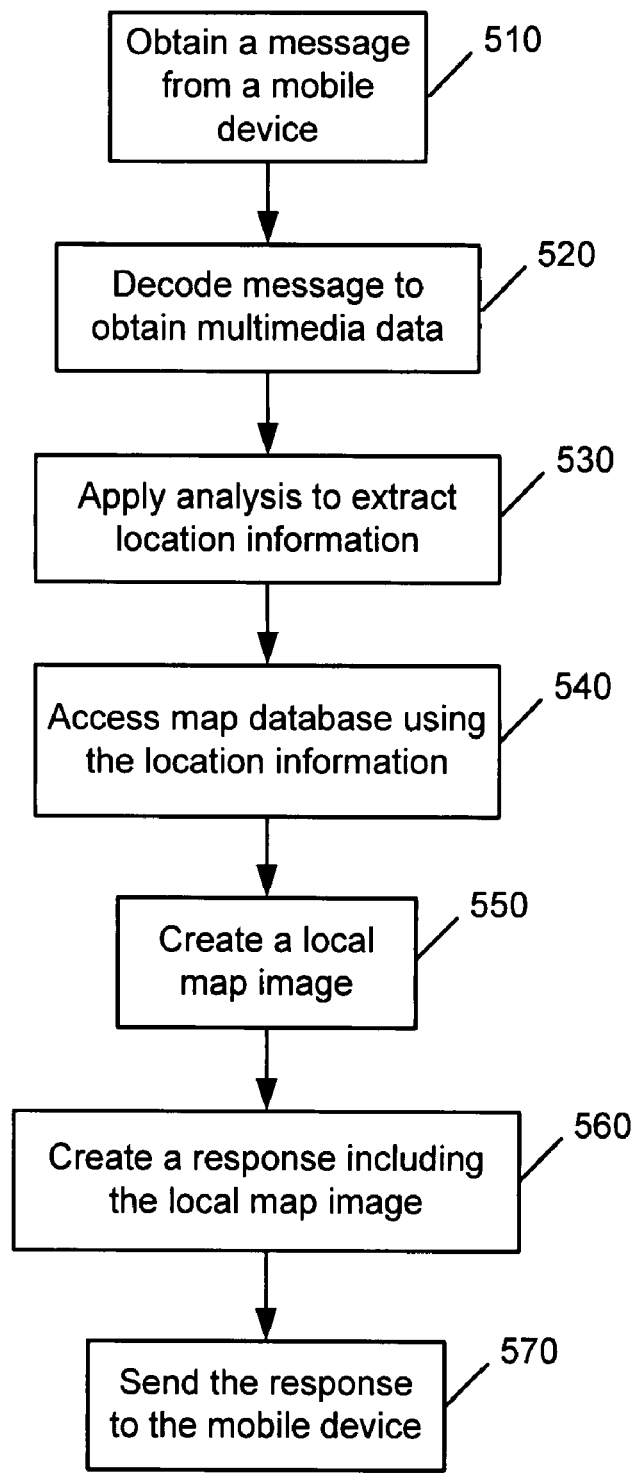
FIG. 5 illustrates an exemplary process for providing contemporaneous maps to a user at a non-GPS enabled mobile device.

FIG. 5 illustrates an exemplary process for generating a contemporaneous local map based on data from a non-GPS enabled mobile device.

At step 510, the map server 130 obtains a message from a non-GPS enabled mobile device. In an exemplary implementation, the message includes multimedia data and other optional location-related data. Optional location-related data include, without limitation, state, city, zip code, and/or other data.

At step 520, the map server 130 decodes the message to obtain the multimedia data.

At step 530, the map server 130 applies an analysis technique to extract any location information from the multimedia data. For example, an OCR process may be applied to any image data to recognize alphanumeric characters. In another example, a speech recognition process may be applied to any audio data to recognize any location information.

At step 540, the map server 130 accesses a map database using the extracted location information to obtain map data for generating a contemporaneous local map. For example, extracted street names may be used to obtain the requisite map data. In an exemplary implementation, the multimedia data may include data relating to multiple locations. In this example, the map server may obtain map data relating to all the locations.

At step 550, the map server 130 generates a local map image based on the map data from the map database. In an exemplary implementation, the server 130 may also generate navigational directions from one location to another location.

At step 560, the map server 130 generates a response including the local map image (and the navigational directions, if any). In an exemplary implementation, the local map image file is either formatted to be displayed at the mobile device or enabled to be reformatted at the mobile device.

At step 570, the response, including the local map, is sent to the mobile device. Thus, the user at a non-GPS enabled device is enabled to obtain contemporaneous maps for its current locations.

A person skilled in the art will recognize that the local maps sent to a user need not be contemporaneous to the user's current location. For example, a user who is interested in having a map image of a location he previously visited may still use the map server to obtain a relevant map. The map server 130 does not need to confirm that the local map is of the user's current location.

III. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate general-purpose processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

IV. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method comprising:
analyzing, via a processor, multimedia data and user entered additional data received in a location request message at a map server from a mobile device to estimate a location of the mobile device, the additional data being different from the multimedia data and including location information related to the multimedia data, the multimedia data and the additional data not including global positioning system data;
generating a map image at the map server based on the location; and
sending the map image from the map server to the mobile device.

2. The method of claim 1, wherein the multimedia data includes image data.

3. The method of claim 2, wherein analyzing the multimedia data includes applying optical character recognition to the image data.

4. The method of claim 1, wherein the multimedia data includes audio data.

5. The method of claim 4, wherein analyzing the multimedia data includes applying speech recognition to the audio data to estimate the location.

6. The method of claim 1, wherein the map image is encoded in accordance with a mobile communication standard.

7. The method of claim 1, further comprising:
generating navigational directions at the map server based on the multimedia data; and
sending the navigational directions from the map server to the mobile device.

8. A map server comprising:
one or more processors implementing a location recognition module to analyze multimedia data received in a location request from a mobile device via a communication network to determine different first and second locations represented by the multimedia data, the multimedia data not including global positioning system data;
a local map creator to:
generate a map image based on the first and second locations; and
generate navigational directions for navigating between the first and second locations determined from the multimedia data, the navigational directions to be sent to the mobile device via the communication network, the first and second locations being different from a current location of the mobile device; and
a response generator to send the map image to the mobile device via the communication network.

9. The map server of claim 8, wherein the multimedia data includes image data.

10. The map server of claim 9, wherein the location recognition module is to apply optical character recognition to the image data to determine the location.

11. The map server of claim 8, wherein the multimedia data includes audio data.

12. The map server of claim 11, wherein the location recognition module is to apply speech recognition to the audio data to determine the location.

13. A tangible computer-readable storage medium storing logic instructions that, when executed, cause a machine to perform a method comprising:
analyzing multimedia data and user entered additional data received in a location request message from a mobile device via a communication network to estimate a location of the mobile device, the additional data being different from the multimedia data and including location information related to the multimedia data, the multimedia data and the additional data not including global positioning system data;
generating a map image based on the location; and
sending the map image to the mobile device via the communication network.

14. The computer-readable storage medium of claim 13, wherein the multimedia data includes image data.

15. The computer-readable storage medium of claim 13, wherein the multimedia data includes audio data.

16. The method of claim 2, wherein the image data represents a street sign.

17. The method of claim 2, wherein the image data represents an address.

18. The method of claim 2, wherein analyzing the multimedia data includes applying optical character recognition to the image data to extract at least one of a street name or a street number.

19. The method of claim 4, wherein the audio data represents a spoken address.

* * * * *